(12) United States Patent
Friedman et al.

(10) Patent No.: US 6,423,170 B1
(45) Date of Patent: Jul. 23, 2002

(54) THERMOPLASTIC INTERLAYER FILM

(75) Inventors: Michael Friedman, Wayne; Glenn T. Visscher, Morris Plains, both of NJ (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 196 days.

(21) Appl. No.: 09/626,274

(22) Filed: Jul. 25, 2000

Related U.S. Application Data

(60) Division of application No. 09/131,859, filed on Aug. 10, 1998, now Pat. No. 6,159,608, which is a continuation-in-part of application No. 08/535,413, filed on Sep. 28, 1995, now Pat. No. 5,792,560.

(51) Int. Cl.[7] .............................................. B29C 47/00
(52) U.S. Cl. .................. 156/244.11; 156/326; 428/442; 428/441; 428/520; 264/176.1
(58) Field of Search ............................ 156/244.11, 324, 156/209, 275.5, 275.7, 326; 428/442, 441, 520; 524/261, 262, 264, 265, 284, 300, 306, 314, 423, 425, 427, 543; 525/333.8, 342; 264/176.1

(56) References Cited

U.S. PATENT DOCUMENTS

| | | | |
|---|---|---|---|
| 4,317,862 A | 3/1982 | Honda et al. | 428/442 |
| 4,339,507 A | 7/1982 | Kurtz et al. | 428/522 |
| 4,477,532 A | 10/1984 | Schmukler et al. | 428/441 |
| 4,511,627 A | 4/1985 | Tanuma et al. | 428/429 |
| 4,952,460 A | 8/1990 | Beckmann et al. | 428/429 |
| 5,094,918 A | 3/1992 | Niwa et al. | 428/440 |
| 5,241,031 A | 8/1993 | Mehta | 526/348.1 |
| 5,278,272 A | 1/1994 | Lai et al. | 526/348.5 |
| 5,372,887 A | 12/1994 | Segawa et al. | 428/409 |
| 5,420,220 A | 5/1995 | Cheruvu et al. | 526/348.1 |
| 5,547,762 A | 8/1996 | Niwa et al. | 428/442 |
| 5,632,835 A | 5/1997 | Niwa et al. | 156/99 |
| 5,759,698 A | 6/1998 | Tanuma et al. | 428/442 |

FOREIGN PATENT DOCUMENTS

| | | | |
|---|---|---|---|
| EP | 756931 A2 | 2/1997 | B32B/27/32 |
| JP | 7267693 | 10/1995 | C03C/27/12 |
| JP | 9174775 | 7/1997 | B32B/27/32 |
| WO | 93/12151 | 6/1993 | C08F/210/02 |
| WO | 94/18263 | 8/1994 | C08J/5/18 |
| WO | 95/27005 | 10/1995 | C08L/23/06 |
| WO | 97/11986 | 4/1997 | C08J/5/18 |

OTHER PUBLICATIONS

US 5,399,437, 03/1995, Georgelos (withdrawn)

*Primary Examiner*—Michael W. Ball
*Assistant Examiner*—Jessica Rossi
(74) *Attorney, Agent, or Firm*—Mary E. Porter

(57) ABSTRACT

High clarity optical and safety glass laminate interlayer films and optical laminates are described. The films and their laminates comprise very low density polyethylene and/or its copolymers, preferably polymerized with metallocene catalysts, and modified with additives, such as coupling agents, clarifying or nucleation agents, UV-light absorbers, pigment or color concentrate, and IR-light blockers. The very low density polyethylene is laminated to EVA film for improved bondability in optical laminates.

9 Claims, No Drawings

THERMOPLASTIC INTERLAYER FILM

BACKGROUND OF THE INVENTION

This application is a division of U.S. Ser. No. 09/131,859, filed Aug. 10, 1998, now U.S. Pat. No. 6,159,608 which is a continuation-in-part of U.S. Ser. No. 08/535,413, filed Sep. 28, 1995, now U.S. Pat. No. 5,792,560. The invention relates to multilayer films of selected thermoplastic formulations that are useful as interlayer films in optical laminates.

Safety glass has existed for more than 80 years, and is widely used for windows in trains, planes, ships, etc. and in the automotive industry, for example, in windshields for cars, trucks and other forms of transportation. It is characterized by high impact and penetration resistance and it does not scatter glass shards and debris when shattered. Safety glass is also used in the construction industry and in the design of modern buildings. It is used, for example, as windows for stores and offices.

Safety glass usually consists of a sandwich of two glass sheets or panels bonded together by means of an interlayer of a polymer film placed between the two glass sheets. One or both of the glass sheets may be replaced by optically clear rigid polymer sheets, such as sheets of a polycarbonate polymer.

The interlayer is made of a relatively thick polymer film exhibiting a toughness and bondability as will cause the glass to adhere to the interlayer in the event of its being cracked or crashed. A number of polymers and polymer compositions have been used to produce transparent interlayer films for bilayer and multiple layer mineral or polymer glass sheets.

Polymer interlayers for mineral and plastic glass must possess a combination of characteristics including very high clarity (low haze), high impact and penetration resistance, excellent UV-light stability, good bondability to glass, low UV-light transmittance, low moisture absorption, high moisture resistance, and extremely high weatherability. Widely used interlayers in safety glass production today are made of complex multicomponent formulations based on polyvinyl butyral (PVB), polyurethane (PU), polyvinylchloride (PVC), ethylene copolymers such as ethylenevinylacetate (EVA), polymeric fatty acid polyamide (PAM), polyester resins such as polyethyleneterephthalate (PET), silicone elastomers (SEL), epoxy resins (ER) or polycarbonates (PC) such as elastomeric polycarbonates (EPC).

Many major glass laminate manufacturers are of the opinion that PVB compositions provide the best overall performance taking costs into consideration. These PVB compositions, therefore, have become the interlayer of choice for many laminated glass applications. Although conventional PVB interlayers perform well, they do, nevertheless, suffer from several drawbacks.

One major drawback of PVB is its moisture sensitivity. Increased moisture in interlayer films results in increased haze and may cause bubble formation in the final laminated flat glass product. This is a problem particularly around the edges of laminates and the extent of the problem increases markedly over time. This is unacceptable to both the manufacturers and their customers. Therefore, special precautions have to be taken to keep the moisture content of the PVB film, and ultimately the haze of the laminated flat glass product, to a minimum. These special precautions may include reducing storage time of the PVB film; refrigeration of the PVB film prior to lamination; pre-drying of the PVB film; and/or using dehumidifiers in the clean rooms where the laminates are prepared. These requisite precautions increase the cost and the difficulty of manufacturing laminates made with a polyvinyl butyral interlayer. Furthermore, despite these precautions and added manufacturing costs, when the edges of the laminated glass are exposed to moisture, a haze will still develop. This becomes a serious problem with the modern flush-mounted windshield favored by modern car designers. These designs call for far less overlap of the rubber mounting holding the laminate in the window aperture. To conceal any haze formation that may develop over time, manufacturers have taken to printing a pattern of black dots, the density of which decreases with distance from the edge of the laminate, around all of the edges.

Another drawback of PVB is the need for a plasticizer in the film formulation for improving the impact, tear and penetration resistance and for improving the bonding of the PVB to the glass. Over time, the plasticizer tends to migrate, leading to changes in the properties of the laminate. One particular concern is that delamination will begin to occur at the edges of the laminated glass and the interlayer will become brittle and lose its safety features.

A very significant drawback of PVB film and optical laminates made using PVB film is the low impact resistance at low temperatures due to the very high glass transition temperature (Tg) of PVB which is close to room temperature 21° C. (70° F.) The Tg of plasticized formulations is in the range from 0° C. to minus 10° C. At temperatures below zero the safety glass made using PVB can be relatively easily destroyed by impacting, and may lose its safety properties.

While many of the other polymers and formulations do not have a moisture absorption problem as significant as PVB or Surlyn™ resin (a Dupont ionomeric resin), they lack the overall performance of the PVB films at comparable costs. Furthermore, some of these polymers and formulations require enhanced processing such as irradiation or the use of additional chemical components such as plasticizers which affect the cost and properties of the film and the optical laminates, e.g., flat glass products, made using the film. Plasticizers tend to migrate over time. This adversely affects the properties of both the film and the products made using the film.

Recently developed metallocene catalyzed, linear low density polyethylene (LLDPE) having very low heat seal temperature, low extractables and improved clarity (compared to LLDPE polymerized using conventional and modified Ziegler-Natta catalysts) has been designed for packaging applications. For example, a metallocene LLDPE film which exhibits a density of at least 0.900 g/ccm, low heat seal temperature, low extractables, and a haze value of less than 20%, is disclosed in U.S. Pat. No. 5,420,220. Packaging film according to this disclosure has less haze when compared to a film extruded of a conventional Ziegler-Natta LLDPE (exhibiting typical haze values greater than 10%). However, haze was measured by ASTM method D-1003 for very thin film samples (0.8–1.0 mil, or approx. 20–25 mcm). Films of much higher thickness (7–14 mil) are used for optical laminates, and the disclosed packaging film is not able to provide the required optical properties. For example safety glass products have to exhibit a haze lower than 4%, some of them lower than 2 or 1%, and in the most demanding car windshields applications 0.3–0.5%, for thicknesses in the range from 5 mil to 40 mil.

It has now been discovered that an economical, easily processed optical laminate with improved properties may be fabricated from polymer glass and/or mineral safety glass containing an interlayer film made of a formulation based on a substantially linear very low or ultra-low density polyethylenic polymer, copolymer, or terpolymer, their blends and alloys. In modern industry the term linear low density polyethylene (LLDPE) relates to an ethylenic polymer or copolymer having a density from 0.925 g/ccm to 0.910 g/ccm; the term linear very low density polyethylene (LVLDPE)—from 0.910 g/ccm to 0.880 g/ccm; and the term linear ultra-low density polyethylene (LULDPE)—from 0.880 g/ccm to 0.850 g/ccm.

Very low and ultra-low density polyethylene and their copolymers with butene, octene, hexene, propylene, pentene, and other comonomers are produced using various metallocene catalyst systems. The substantially linear, very low and ultra-low density ethylenic polymers and copolymers, when co-extruded or laminated with one or more layers of EVA film, provide an interlayer film for a glass "sandwich" characterized by excellent adhesion to glass and polymeric substrates and having high clarity, very high moisture resistance, extremely low moisture absorption during storage, handling and use, very high UV-light stability, and good heat resistance. Low density, high yield (a higher number of square meters of film produced from one weight unit of resin) and higher impact and penetration resistance of these polymers enables one to use a thinner interlayer film and provides significant economical advantages compared to PVB and monolithic EVA films and their optical laminates. The costs of suggested interlayer can be 20–30% less than conventional PVB interlayer. The cost of an interlayer is usually about 30% of the cost of the final optical laminate. Therefore the significant cost reduction of the interlayer translates into substantial cost reduction of the laminated glass product.

SUMMARY OF THE INVENTION

The invention is an interlayer film for use in an optical laminate, the optical laminate having a haze value of less than 4% at a film thickness of 125 to 1000 mcm, comprising a film of at least one substantially linear low density polyolefin, having a polydispersity index of less than 3.5, a density from about 0.850 to 0.905 g/ccm and less than 20%, by weight, crystallinity, laminated to at least one film of ethylene vinyl acetate copolymer. The invention includes laminates made with the interlayer film.

This invention also provides optical laminates containing the interlayer film and a process for manufacturing these products comprising the steps of selecting a metallocene catalyzed substantially linear, very low density polyethylene (LVLDPE) having a density lower than about 0.905 g/ccm or ultra-low density polyethylyne (LULDPE) having a density lower than about 0.880 g/ccm, Laminating a 125 to 1000 mcm thick film of the selected polyethylene to at least one film of EVA to form an interlayer film, and incorporating this interlayer film between at least two sheets of mineral or polymer glass. It is understood that the terms "LVLDPE" and "LULDPE" as used herein embrace not only homopolyethylene but also copolymers of ethylene with other comonomers known in the art, such as alpha olefins (e.g., butene, octene, propylene, pentene and hexene).

The interlayer film may also comprise an additive package consisting of: coupling agents (0.1 to 2.0%, by weight) to improve adhesion to glass and/or plastic panels; clarifying (nucleation) agents (0.02 to 2.0%, by weight) to increase the light transmittance (reduce the haze) of the interlayer; and UV-light absorbers to decrease the UV-light transmittance. Other additives also can be incorporated to achieve special properties in the safety glass and/or plastic laminates. A crosslinking agent may be added in the amount of from about 0.05% to about 2% by weight of the total formulation. Examples of other additives include pigments, colorizing agents or concentrates and IR-light blockers.

The films of the present invention also may be used as an interlayer in other multilayer products manufactured using mineral glass or plastic sheets or panels.

DETAILED DESCRIPTION OF THE PREFERRED EMBODIMENTS

Film made of substantially linear LVLDPE and LULDPE used herein should have a clarity higher than 70%, preferably higher than 75%, and most preferably higher than 80%, and a haze value lower than 4% preferably lower than 2% and most preferably lower than 1% (both optical parameters measured in accordance to ASTM D-1003) to be suitable for production of an interlayer film in optical laminates. It is preferable to use substantially linear ethylenic polymers/copolymers polymerized using metallocene catalyst systems because this type of catalyst provides thermoplastic polymers with a low density and very narrow molecular weight distribution (MWD). The MWD of polymers is commonly characterized by the polydispersity index (PI), i.e. the ratio between the weight average molecular weight and the number average molecular weight (Mw/Mn), each of which is calculated from molecular weight distribution measured by gel permeation chromatography (GPC). The PI values for metallocene catalyzed PE are very small, i.e. the MWDs are very narrow. The PI values of metallocene PE are usually lower than 3.5, and there are available industrial grades of substantially LLDPE typically having PI in a narrow range 2.0–2.5. Narrow MWD, i.e. very uniform length of the macromolecular chains, along with extremely narrow and uniform comonomer and branches distribution leads to low crystallinity (less than 20%), high clarity and low film haze.

High optical quality film and mineral safety glass (haze less than 3%) is produced by using ethylenic resin with polydispersity less than 3.5, preferably less than 2.5, most preferably less than 2.3; density preferably less than 0.910 g/ccm, most preferably less than 0.885 g/ccm; and crystallinity of less than 20%, by weight, preferably less than 15%, most preferably less than 10%. Additional requirements include a comonomer content of no more than 10 mole % and, for most products, a film additive package.

The choice of the most preferable resin depends on the type of laminate to be produced and optical properties requirements for different applications. For example, if the required haze of interlayer film and glass laminate (good quality mineral glass up to 5–6 mm thick does not increase the haze of the laminae) is less than 3%, a LVLDPE with PI=3.5, density 0.910 g/ccm, and crystallinity less than 20% can be used as a basic resin to produce the interlayer. Such an interlayer can be used in manufacturing of sound shields, screens, etc. For more demanding applications such as special glass screens, windshields and some types of architectural glass, the industry standards require a higher transparency of the final product, i.e. haze on a level of 2% and lower. In this case only LULDPE with a PI lower than 2.5, density lower than 0.880 g/ccm, and crystallinity lower than 15% is appropriate. For many important applications such as large public building windows and other types of special architectural glass and glazing of cars and windows for trains and ships, the haze of an optical laminate should not exceed 1%, and for these applications LULDPE grades with PI less than 2.5, density less than 0.880 g/ccm, and crystallinity less than 10% should be used. For automobile windshields (the most demanding type of safety glass in terms of haze values) polymers with PI less than 2.3, density lower than 0.880 g/ccm, and crystallinity lower than 10% are preferred.

Light transparency and haze of film and glass laminate depends on the thickness of the interlayer. The minimum thickness of the interlayer film is determined by the safety requirements (impact and penetration resistance and ability to hold glass debris while crashing). The very high impact, notch and tear resistance of the films allows a reduction of the thickness of the interlayer needed to meet the safety standards for the glass "sandwich". For example, 0.35 mm (14 mil) thick PVB-based film commonly used in manufacturing of architectural safety glass can be replaced by the glass made using a 0.25 mm (10 mil) thick interlayer according to the invention. For some optical products even a 0.175 mm (7 mil) interlayer can be used. Significant reduction of the interlayer thickness helps further to increase the yield of film, reduce the haze, and make the interlayer and the laminated product more economical.

Ethylenic copolymer resin used to produce an interlayer film according to the present disclosure should be chosen from ethylenic copolymers with a limited content of comonomers relative to ethylene monomer. The increase of the content of comonomer higher than 10 mole % leads to a decrease in the melting and softening points of the resin. This is undesirable because the mineral safety glass has to pass the "boiling test" (boiling the laminate in water for an hour should not increase the haze of the product and should not lead to creation of bubbles in the interlayer)

Use of linear ethylenic copolymers or terpolymers with a content of more than 10% mole of comonomers is not advisable due to their low melting (softening) temperatures of about 50° C. to 75° C. To be useful herein, these polymers may be crosslinked to increase their melting temperature to the necessary level (100–140° C.) The crosslinking requires a treatment with, for example, peroxides or radiation. However, increased content of peroxides increases the melt viscosity, and energy consumption, and can lead to the loss of optical quality of film due to creation of gels. High radiation intensity (for example, higher than 10 MRad for E-Beam treatment) creates similar problems and economic disadvantages.

Unlike PVB film, the polyolefin film made according to the present invention does not need plasticizers due to the high impact, notch and tear resistance characteristics of substantially linear ethylenic polymers/copolymers.

Because polyolefins have poor adhesion to substrates including other polymers and mineral glass due to the non-polarity of polyolefin molecules, interlayer film according to the present invention may contain a coupling agent, e.g., a silane, to provide a good polyolefin film bond to glass and other substrates. In a most preferred embodiment, the interlayer film comprises a "skin" of EVA film on one or both surfaces of the polyolefin film. With the EVA skin, the interlayer film may be readily and securely bonded (e.g., by an autoclave process or heat and pressure) to a glass or polymeric substrate without the addition of a coupling agent to the polyolefin and without utilizing a primer on the glass or substrate. Compared to polyolefin films containing silane coupling agent additives, the EVA skin provides an adhesive layer with relatively high elasticity between interlayer film and lamina and, therefore, yields a superior laminate. Thus, coupling agents and primers are optional elements of the interlayer films and optical laminates made with the polyolefin film/EVA film laminate.

The silane coupling materials, and any of the other, optional film additives described herein, may be added to the polyolefin film, or to the EVA film, or both. The interlayer film may contain these optional additives only in the polyolefin film, or only in the EVA film, or in both, depending upon the attibutes and requirements of the optical laminate application.

In a preferred embodiment, a crosslinking agent, including, but not limited to a mixture of peroxide and initiator, may be added to the EVA to increase the use temperature of the resulting interlayer film and laminate, and to lower the haze value of the laminate.

The interlayer film also preferably contains an efficient UV-light absorber. Other additives also can be incorporated to achieve special properties in the optical laminates. Examples of other additives include pigments, colorizing agents or concentrates and IR-blockers. The films of the present invention can be used as an interlayer in safety glass and for other bilayer and multilayer products manufactured using mineral glass or plastic sheets or panels.

The recrystallization which occurs during hot lamination of the interlayer to the polymer or mineral substrate is controlled to avoid haze formation. The process of lamination of optical laminates is carried out under pressure at elevated temperatures. For example, modern safety glass is produced commercially using PVB interlayer film in an autoclave under pressure at temperatures in the range of about 110–185° C. The film is exposed to these conditions for a relatively long time, up to several hours. Crystallization ("recrystallisation") of the polymer in the interlayer under these conditions can lead to haze increase and loss of optical quality. Crosslinking of the resin may be used to minimize recrystallisation during the heat-lamination process. In addition, a low or medium grade of crosslinking provides an increase of the softening temperature of substantially linear polyethylenic resin up to the use temperature 80–130° C. typical for PVB or even higher. Various crosslinking methods can be used, for example, peroxide, peroxide-silanol and radiation (E-beam) treatment. Peroxide technology is preferred.

Additional stabilization of the morphological structure of the polymer to maintain the crystallinity and haze on a very low level during lamination and thermal exposure of the final laminate (to heat and sun) can be achieved by incorporation of a nucleation (clarifying) agent into the interlayer formulation.

The laminated products according to the present invention are optical laminates made using interlayer films of 0.125–1.0 mm (5–40 mil) thickness made of formulations based on substantially linear VLDPE and ULDPE polymers and their copolymers, blends and alloys having densities respectively in the range from about 0.910 g/ccm to about 0.880 g/ccm (LVLDPE), and from about 0.880 g/ccm to 0.850 g/ccm (LULDPE). These may be polymerized using a metallocene catalyst system which provides a substantially linear structure of macromolecular chains and a very narrow MWD, i.e. Polydispersity Index lower than 3.5, preferably lower than 2.5 and most preferably lower than 2.3, and a very low initial crystallinity of the resin, i.e., lower than 20% by weight, preferably lower than 15%, and most preferably lower than 10%. Substantially linear polyethylenic polymers or copolymers with density lower than 0.850 g/ccm have a crystallinity less than 10% by weight, and a very low initial haze (0.3–3%) However, the very low melting temperature (55–60° C.) of these polyethylenic resins creates a need for heavy cross-linking to increase their use temperature, and avoid processing problems. The industry requirements for safety glass, cannot be met using LULDPE resin with density lower than 0.850 g/ccm because the amount of crosslinking needed to thermally stabilize the resin creates an increase in laminate haze.

The formulations may be blended with an additive package in a high speed dry mixer and compounded using a melt compounding extruder. Twin screw co-rotating extruder Model ZSK-30 with 30 mm screws and Model ZDS-53 with 53 mm screws made by Werner Pfleiderer Corporation was utilized in the present invention but any other suitable compounding extruder can be used. The compounding machine should provide a uniform mixing of the basic thermoplastic resin with relatively small quantities of required additives.

In a preferred method of producing the polyolefin films useful in the invention, a melt exiting the extruder may be formed into strings using a die plate with a number of holes, e.g., 6 holes. The strings may be cooled in a water bath; cut into pellets of standard size (1–4 mm in diameter and 2.5–5 mm in length); and dried. The pelletized formulation may be stored and extruded into a film as needed.

Both melt casting extrusion technology and melt blown extrusion technologies can be used for film manufacturing. In a suitable process film extrusion lines may be equipped with flat extrusion dies and casting rolls or drums used to calibrate the thickness and to cool the film web. After cooling, the film may be wound into rolls.

The thickness and the width of the product selected depend on the particular application (e.g., architectural glass, automotive glass, special plastic laminates), and can vary in the range from about 125 mcm (5 mil) to 1,000 mcm (40 mil).

The polymer can be crosslinked if necessary before or after film formation to increase the softening point and the use temperature of the interlayer. Methods of polyolefin crosslinking are known in the industry and include peroxide, peroxide-silanol, and radiation technologies.

In all films and laminates herein, the basic preferred resin is a VLDPE thermoplastic material (plastomer or elastomer) chosen from the PE polymers and copolymers polymerized using metallocenes catalyst systems and having densities lower than about 0.910 g/ccm. The conventional low density polyethylenes (LDPE), typically have densities in the range of from about 0.915–0.925 g/cc, and the so-called medium density polyethylenes (MDPE) have densities in the range of from about 0.926–0.940 g/ccm.

The VLDPE group of resins is usually further subdivided into PE plastomers which are resins with low crystallinity, ranging from about 10–20%, having densities in the range of from about 0.914–0.900 g/ccm; and PE elastomers which are completely amorphous resins having densities in the range of from about 0.899 to 0.860 g/cc which contain a comonomer which when polymerized yields a rubber such as a diene rubber.

Many grades of linear ethylene polymer (plastomers and elastomers), such as Exxon "EXACT" family of metallocenes PE plastomers and elastomers, Dow "AFFINITY" family of PE plastomers, and Dow "ENGAGE" family of PE elastomers, are suitable for extrusion of the interlayer according to the present invention. Examples of some of the basic resin grades suitable for the interlayer film are given below in Table 1.

TABLE 1

Properties of some LVLDPE and LULDPE Polymers

| Polymer grade | Comonomer | Density g/ccm | DSC °C. | Tensile strength MD/TD Psi | Elongation at break MD/TD % | Impact resistance[b] g/mil | Haze[a] % |
|---|---|---|---|---|---|---|---|
| Exxon EXACT Resin: | | | | | | | |
| 3027 | Butene | 0.900 | 92 | 8160/5210 | 450/700 | 408 | 0.4 |
| 3033 | Terpolymer | 0.900 | 94 | 9800/9020 | 470/580 | 1125 | 2.9 |
| 3034 | Terpolymer | 0.900 | 95 | 10420/8280 | 350/610 | 1450 | 0.3 |
| 4011 | Butene | 0.885 | 66 | 3260/3260 | 800/800 | 350 | 0.4 |
| 3028 | Butene | 0.900 | 92 | 8670/7250 | 590/680 | 177 | 3.1 |
| 4015 | Butene | 0.896 | 83 | 7409/6372 | 480/587 | 1368 | 0.8 |
| 4049 | Butene | 0.875 | 82 | 4670/4450 | 690/780 | 345 | 0.3 |
| SLP 9042 | Terpolymer | 0.900 | 96 | 8150/8200 | 460/550 | 1125 | 0.8 |
| SLP 9045 | Terpolymer | 0.900 | 99 | 7390/5100 | 400/700 | 2062 | 0.3 |
| Dow "AFFINITY" Resin: | | | | | | | |
| PL 1880 | a-olefin | 0.902 | 100 | 7170/3800 | 570/560 | 500 | 1.1 |
| PL 1845 | a-olefin | 0.910 | 103 | 6580/4870 | 527/660 | 362 | 0.7 |
| SM 1250 | a-olefin | 0.885 | 51 | 3700/3950 | 1000/900 | 500 | 1.3 |
| Dow "ENGAGE" Resin: | | | | | | | |
| KC 8852 | a-olefin | 0.875 | 79 | 4600/4900 | 890/850 | 150 | 0.5 |
| EG 8150 | a-olefin | 0.868 | 62 | 1600/1750 | 880/790 | 450 | 0.4 |

[a]Haze is measured using ASTM D-1003 method for 0.8–1.0 mil cast film samples.
[b]Impact resistance is Dart Drop Impact, F50 values measured using ASTM D-1709 method.

The resin grades in Table 1 are given as an illustration only. A number of other metallocenes LVLDPE and LULDPE plastomers and elastomers with a density of less than about 0.905 g/ccm also can be used to produce an interlayer for glass and plastic laminates.

The additive package may include various functional components. The type and content depend on the type and application of the safety glass and/or plastic laminate to be produced. Examples of some additives are described herein. These, as well as conventional additives, may be incorporated into the interlayer formulation.

Coupling agents may be added to improve the adhesion of the plastic interlayer to glass and other substrates without primer coating of the substrate. Preferred coupling agents include vinyl-triethoxy-silane, and amino-propyl-triethoxy-silane but other coupling agents can also be incorporated into the formulations. The concentration of the coupling agent should be in the range from about 0.2% to about 2.0%. Silanes do not improve the adhesion of the interlayer to glass when they are used in concentrations lower than about 0.2%. In concentrations higher than about 2.0% they increase the haze of the interlayer. The preferable range of the coupling agent is from about 0.5% to about 2.0%, and the most preferable is from about 0.7% to about 1.5%.

A UV-light absorber may be added to block the UV-light and to provide protection from the negative influence of the transmission of UV-light. A number of UV-light absorbers known in the industry can be used. Preferred are CHIMASORB TINUVIN 944 UV-light absorber, supplied by CIBA-Geigy Corporation (Switzerland/Germany); CYASORB UV-9 absorber, available from American Cyanamid Corporation, and polymerizable benzotriazole (NORBLOCK™) absorber, supplied by Noramco Corporation (USA). Absorbers should be used in concentrations in the range from about 0.1% to about 1.5%, preferable in the range from about 0.25% to about 1.5%, and most preferable in the range from about 1.0% to about 1.5%.

Nucleation agent may be added to improve optical properties and clarity; to reduce the haze of the film, and to stabilize the morphological structure of the material. Incorporation of a nucleation agent helps to reduce the dimensions of crystallinic units and provides stability after reheating of the film during lamination or after exposure to sun or other sources of heat. Various nucleation agents are commercially available. Most of them are based on adipic acid compounds. One suitable type of nucleating agent is available from Milliken Corporation under the MILLAD trade name. Several grades of Milliken products are available and the more preferred include: MILLAD 3905, 3940 and 3988 grades.

The concentration of the nucleation agent may be in the range of from about 0.05% to about 2.0%. The content of the nucleating agent depends on the initial haze of the polymeric matrix, the thickness of film to be clarified and the density and crystallinity of the resin. The preferable concentration of MILLAD 3905, 3940 and 3988 nucleating agent in the metallocenes LVLDPE and LULDPE polymers according to the present invention is in the range of from about 0.2% to about 2.0% by weight of the formulation and the most preferable being from about 0.5% to about 1.0%.

Very small particles of minerals can also be used as nucleation agents. For example, submicronized powders of calcium sulfate or calcium carbonate (with equivalent particle size in the range from about 0.1 mcm to about 3 mcm) of high purity have practically the same efficiency as adipic acid type nucleation agents.

Pigments, dyes, and/or color concentrates may be added when special color effects are needed in the safety glass or plastic laminate for architectural, decorative and other applications. They are used in such concentrations as are determined by coloration technology.

Other additives can also be incorporated to achieve special properties of the interlayer and resultant interlayer film product such as, for example, to achieve reduced IR-light transmittance; to increase reflection, and to decrease the blocking and to improve the slipping of film.

An interlayer film product according to the present invention may be smooth surfaced or it may also have embossed patterns on its surface which assist the evacuation of air between the glass plates (sheets) and the interlayer during lamination. The product may have embossed patterns on one or both sides of the film which are made with an embossing roll. Patterns also may be created using an extrusion die with a specific design profile.

Crosslinking of the polymer according to the present invention can be achieved by different techniques. The peroxide technology using organic peroxides (for example dicumyl peroxide) incorporated into the formulation is very efficient. It increases the use temperature up to at least 20°–70° C. However, this technology requires very precise feeding equipment and must be used very carefully since it can lead to an increase of the haze and gel content in the film.

Peroxide-silanol technology requires a much lower quantity of peroxide and is a convenient process. Peroxide-silanol crosslinking provides a slightly lower grade of crosslinking compared to organic peroxides, but it does not require special feeding equipment, and does not create difficulties in achieving required optical properties of the product. The silanol technology may be implemented using a concentrate of the peroxide-silanol-catalyst mixture in a polyolefin matrix. This type of concentrate is available, for example, from OSI Corporation (USA) under the SILCAT R trademark. The concentrate is mixed with the basic resin and other additives in a dry blender, compounded in a twin-screw extruder, pelletized, and extruded into film. The silanol is grafted to the polymer chains during compounding and film extrusion. The crosslinking of the polymer occurs only after water treatment of the film. The crosslinking can be accelerated by treatment in hot water by boiling or by steam treatment. The final product should be dried before lamination to glass or plastic substrates.

Peroxide-silanol-catalyst SILCAT R concentrate should be used in concentrations in the range from about 0.2% to about 5%, more preferable from about 0.5% to about 3%, and most preferable from about 0.5% to about 1.7%. The concentration of the crosslinking agent should be higher for basic plastomer/elastomer resins with lower densities and lower softening points.

Another method of crosslinking of the polymer material according to the present disclosure is radiation, for example, E-beam treatment of the extruded film. E-beam radiation with an intensity in the range from about 2 MRd to about 20 MRd provides an increase of the softening point by 20°–50° C. The most preferable range of the radiation intensity is in the range from about 5 MRd to about 15 MRd for film made of formulations based on metallocenes PE elastomers with an initial softening point of 55°–90° C., and in the range from about 2.5 MRd to about 10 MRd for film made of formulations based on metallocenes PE plastomers with an initial softening point of 90°–105° C. E-beam treatment of the above intensities provides the softening temperature (Vicat Softening Point) in the range from 110°–145° C. required for safety glass applications, and which is comparable to the PVB interlayer being currently used in the industry.

Different additive packages using the above compounds may be used for manufacturing of interlayer film for different applications.

The properties of the resultant products depend on the basic resin, additive package, and thickness of film. A number of properties of the product according to the present invention such as moisture absorption, UV-light stability, impact resistance, low temperature brittleness, processability and costs are superior to the PVB interlayer currently being used for lamination of glass and other substrates. Some properties such as reduced haze, UV-light blockage, penetration resistance of the present product are comparable to PVB. The products according to the present invention do not contain plasticizers which may cause yellowness of the interlayer with time, and provide a higher yield (more sq. ft. of film per pound of resin) due to the lower density of the basic material (0.850–0.905 g/ccm compared to 1.10–1.15 g/ccm for PVB).

The interlayer according to the present invention can be laminated to mineral glass and polymer substrates using the same technology and conditions being used for the PVB interlayer. Good quality mineral glass laminates can be manufactured in autoclaves at temperature in the range from 140° C. to 170° C. and pressure in the range from 12 bar to 23 bar. Frequently used autoclave lamination conditions are: temperature in the range from 135° C. to 165° C. and pressure in the range from 13 bar to 17 bar.

The following examples of embodiments of the invention can be used for specific illustration of the above. These examples and comparative examples are given to illustrate the invention in more detail and are not intended to be limiting.

Processing of LVLDPE and LULDPE-based Formulations into Films

Formulations based on LVLDPE and LULDPE polymers were produced by mixing their melts with an additive packages using the twin-screw extruder ZSK-30 made by Werner Pfleiderer Co. of Ramsey, N.J., equipped with two co-rotating screws with a diameter of 30 mm. All formulations were premixed in a dry high speed (turbo) mixer at 300 rpm for 20 min and then fed into the twin-screw extruder. Extruder ZSK-30 was equipped with a die plate having six holes. All formulations were extruded into strings. The strings were cooled in a water bath and then cut into pellets of a standard size (2.5–3 mm in diameter and 3–4 mm in length). The twin-screw extruder had the following temperatures at the barrel: feeding zone #1—115–125° C., barrel zone #2—180–195° C., barrel zone #3—205–225° C., barrel zone #4—215–230° C., die plate—220–245° C. The speed of the screws was 150 rpm. The pellets were dried using a room temperature air stream.

The extruded pellets were processed into films using a cast film line consisting of a 30 mm single screw extruder made by Davis Standard-Killion, New Jersey. The screw of the Killion extruder had a diameter of 30 mm and a relative screw length of 24 diameters. The extruder was equipped with a flat extrusion die having an orifice which was approximately 28 cm (11 inches) wide. Films of two thicknesses (0.18 and 0.36 mm) were produced from each formulation. Table 2 describes the formulations produced. The barrel of the single screw film extruder was divided into four heating zones progressively increasing the temperature of the polymer material up to the adapter, filter, and the flat die. The barrel temperature was maintained in each of zones 1–4 in the range 150–160°, 190–200° C., 180–220° C., 230–245° C., 240–260° C. and 240–260° C., respectively. The temperature of the adapter was maintained at approximately 230–260° C. The temperature of the die was maintained approximately at 245–255° C. in the middle sections, at 255–265° C. at the both edges of the die, and at 260–270° C. at the lips of the die.

The temperatures were varied in each zone in a relatively narrow range according to the melt flow rate of the resin used. The speed of the screw was maintained at between 14–17 rpm for 0.18 mm thick films and 19–22 rpm for 0.36 mm thick films.

Each film was extruded and cooled using a three roll casting roll stock and was wound onto 7.6 cm cores. Fifteen samples were cut for testing from each film produced. At each of five sampling locations which were 10 linear feet apart, samples were obtained at three points across the film web (from each of the edges and from the middle).

For EVA film/polyolefin film laminates, the EVA film is preferably co-extruded in an A/B/A (EVA/polyolefin/EVA) configuration to form a symmetrical laminated interlayer film. The EVA film may be extruded separately from the polyolefin film, or cast onto a surface to form a film in the manner described for the polyolefin film. Suitable EVA materials for optical laminate interlayer films may be obtained from Bridgestone Corporation, Tokyo, Japan, Exxon Corporation, Baytown, Tex., Springborn Technology & Resources, Inc., Enfield, Conn., and Norton Performance Plastics Corp., Wayne, N.J.

Film Testing Procedures

Film samples produced according to the above description were tested for water content after storage, softening point, tensile strength and elongation at break, tear resistance, light transmittance and haze.

The test for water content after storage was performed by measuring the change in weight of the sample before and after exposing a sample of film to 50% relative humidity at 20° C. for 14 days. The softening point was measured on a differential scanning calorimeter (DSC) heating at a rate of 2.5° C. per minute. The elongation on break and tensile strength was determined by ASTM D-638 testing method. The test for tear strength was performed using ASTM D-882 testing method. The transmission and the haze were measured after laminating 0.36 mm film between two layers of 3 mm thick sheets of clear, soda-lime-silicate glass. The transmission was measured using ANSI Standard Z26.1T2. The haze was measured using German Standard DIN R43-A.3/4.

Glass Laminate Preparation

Samples of safety glass laminates were prepared as described below for use in these examples. All samples were produced using clear soda-lime-silicate glass sheets of 3 mm thickness and dimensions of 10×10 cm which were cleaned using acetone to remove dust, grease and other contaminates from the glass surface. Prior to this step PVB film for the control samples was dried for several hours to reduce the moisture content to 0.5% by weight or lower, and was used for lamination immediately after drying. The other films did not require a drying step before lamination.

For laminating, a piece of film was cut to obtain a sample which was 10×10 cm. This sample was put onto the surface of the bottom glass sheet and pressed onto the glass sheet using a rubber roll. Another glass sheet was placed on top of the film obtaining a sandwich structure which was then clamped. This sandwich was placed in a laboratory press, Model 3891, manufactured by Carver, Inc., Wabash, Ind., equipped with a temperature-pressure-time control system monitored by a microprocessor. The following cycle was used to laminate the glass: heating from room temperature to 135° C. in 1 hour, holding at 135° C. and pressure 13.5 Bar for 30 minutes, slow release to normal pressure, and cooling to room temperature in 2 hours. Heating melts the film surfaces during the lamination process.

The glass-film-glass laminates were tested and results were compared with those obtained for PVB film sold under the Saflex SR 41 trademark by Monsanto, St.Louis, Mo., and ethylene-vinyl-acetate (EVA) film sold under the EVA Poly BD 300 trademark by Elf Atochem, Philadelphia, Pa., which are used commercially as interlayers in safety glass manufacturing.

EXAMPLE 1

Several sets of film were made using LVLDPE and LULDPE resins of practically constant molecular weight (about 100,000) but various MWD, with a polydispersity index (PI=Mw/Mn ratio) in the range from 1.02–1.04 (practically monodisperse polymers) to 4.5–6.0. All samples were made using the same additive package containing 1.0% of coupling agent vinyltriethoxysilane and 0.9% of Millad 3940 nucleation agent.

Due to the influence of PI on the polymer crystallization, interlayer films made of these above resins exhibited a significant difference in haze. Results shown in Table 2 confirm that the PI of the resin should be lower than 3.5, preferably less than 2.3, and most preferably less than 2.2, to obtain haze levels suitable for optical films.

TABLE 2

| Resin samples | MWD (PI) | Haze of glass-film-glass laminates |
|---|---|---|
| M-1 | 1.02 | 0.54–0.68 |
| M-2 | 1.04 | 0.57–0.80 |
| M-3 | 1.08 | 0.61–0.90 |
| E-1 | 2.00 | 0.59–0.87 |
| E-2 | 2.20 | 0.58–1.30 |
| E-3 | 2.30 | 0.77–1.15 |
| D-1 | 2.20 | 0.87–1.40 |
| D-2 | 2.30 | 0.76–1.55 |
| U-1 | 4.00 | 1.96–2.35 |
| U-2 | 4.50 | 1.99–3.85 |

EXAMPLE 2

Ultraviolet light absorber was used to provide film and lamina capable of blocking UV-light. Data presented in Table 3 were obtained using glass-film-glass sandwiches manufactured using 0.36 mm thick interlayer film made of Exxon Exact 3024 resin. Similar results were obtained using Exxon Exact 4011 and 4015 resins and other LVLDPE resins containing different quantities of UV-light absorbers.

TABLE 3

| | UV-light transmittance[a] (%) of laminates with | | |
|---|---|---|---|
| % UV absorber | Chimasorb[b] 944 FD | UV-Check[c] AM 300 | Norblock[d] 7966 |
| 0.00 | 54.5–57.1 | 54.5–57.1 | 54.5–57.1 |
| 0.05 | 47.8–54.6 | 47.3–51.4 | 40.2–43.4 |
| 0.10 | 12.8–16.1 | 11.4–13.5 | 9.9–11.2 |
| 0.25 | 9.9–11.9 | 9.0–10.7 | 6.4–7.0 |
| 0.50 | 4.9–5.1 | 4.6–5.0 | 3.3–3.8 |
| 0.75 | 3.3–3.8 | 3.0–3.6 | 1.6–2.0 |
| 0.90 | 1.9–2.8 | 1.6–1.9 | 0.7–0.9 |
| 1.00 | 0.8–0.9 | 0.6–0.8 | 0.3–0.5 |
| 1.20 | 0.3–0.5 | 0.3–0.5 | 0.2–0.3 |

TABLE 3-continued

| | UV-light transmittance[a] (%) of laminates with | | |
|---|---|---|---|
| % UV absorber | Chimasorb[b] 944 FD | UV-Check[c] AM 300 | Norblock[d] 7966 |
| 1.50 | 0.3–0.4 | 0.3–0.4 | 0.1–0.3 |
| 2.00 | 0.2–0.3 | 0.2–0.3 | 0.0–0.1 |

[a]Light transmittance was measured by using the Haze-Gard Plus devi from BYK Gardner Corp.
[b]Chimasorb 944 LD absorber was obtained from Ciba-Geigy Corp.
[c]UV-Check AM 300 absorber was obtained from Ferro Corporation.
[d]Norblock 7966 absorber was obtained from Noramco, Inc.

At concentrations of 1.5–2.0% absorber a negative influence of the UV-light absorber on the haze of film and laminate was observed.

UV-light blockage properties can be achieved using various UV-light absorbers incorporated into the film formulation in quantities from 0.1% to 1.5%, preferably from 0.25% to 1.5%, and most preferably from 1.0% to 1.5%, without loss of haze or other critical film properties. A concentration of UV-light absorber lower than 0.1% is not efficient.

Polymerizable absorbers (e.g., Norblock absorber) are more efficient and can be used in smaller quantities than non-polymerizable compounds.

EXAMPLE 3

Coupling agents were used to increase the bondability of the film to a lamina without pre-treatment of the surface of the lamina with primers.

Several sets of formulations were prepared using metallocene LVLDPE terpolymeric Exact 3033 plastomer produced by Exxon and LULDPE KC 8852 elastomer produced by Dow with coupling agents vinyltriethoxysilane (VTES) and aminopropyltriethoxysilane (APTES), to determine the optimal concentration of silanes in the film. Films were extruded following by lamination of glass-film-glass samples in an autoclave. Pummel values were measured for films made with and without coupling agents. The results of evaluation of adhesion (measurements of the Pummel value) showed (see Table 5) that either VTES or APTES practically do not improve the bondability of the interlayer to mineral glass in concentration lower than 0.2% by weight. In quantities more than 2% by weight silanes become release agents and significantly decrease the Pummel values.

TABLE 4

| | Silane | Adhesion (Pummel values) | |
|---|---|---|---|
| Basic resin | % (wt) | VTES | APTES |
| Exact 3033: | | | |
| | 0.00 | — | — |
| | 0.10 | 0–1 | 0–1 |
| | 0.15 | 0–1 | 1 |
| | 0.20 | 2 | 2–3 |
| | 0.25 | 2–3 | 2–3 |
| | 0.50 | 3–4 | 3–4 |
| | 0.70 | 4–5 | 4–6 |
| | 0.90 | 4–5 | 4–6 |
| | 1.00 | 5–6 | 6–7 |
| | 1.20 | 7–8 | 8–9 |
| | 1.50 | 8–9 | 9–10 |
| | 1.70 | 8–9 | 9–10 |

TABLE 4-continued

| Basic resin | Silane % (wt) | Adhesion (Pummel values) VTES | APTES |
|---|---|---|---|
| | 2.00 | 7–8 | 8–9 |
| | 2.20 | 3–4 | 4–5 |
| | 2.50 | 1–2 | 2–3 |
| KC 8852: | | | |
| | 0.00 | — | — |
| | 0.15 | 0 | 0 |
| | 0.35 | 0 | 0–1 |
| | 0.50 | 1–2 | 1–2 |
| | 0.70 | 2–3 | 3–4 |
| | 0.90 | 4–5 | 6–7 |
| | 1.50 | 5–6 | 7–8 |
| | 1.70 | 8–9 | 9–10 |
| | 2.00 | 8–9 | 9–10 |
| | 2.20 | 3–4 | 3–4 |
| | 2.40 | 1–2 | 1–2 |

All results in the Table 5 are average data of measurements conducted using 4–5 similar samples.

Examples in Table 5 show that silane coupling agents are efficient in the range from 0.2% to 2.0%, however, the preferred adhesion to glass (Pummel values not less than 4–5 units) are achieved when either VTES or APTES are incorporated into formulation in quantities from 0.7% to 2.0%, and most preferable from 0.7% to 1.5%. Coupling agents in concentration higher than 1.5% slightly increase the haze of film, and higher than 2.0% the haze increase becomes unacceptable.

EXAMPLE 4

Clarifying agents were used to increase the transparency and decrease the haze of the film. The clarifying agents are nucleation agents which decrease the haze and increase the transparency of the film by decreasing the amount of crystallinity, and controlling the size and uniformity of the crystals in the film. The initial crystallinity of LVLDPE and LULDPE polymers used according to the present disclosure was less than 20%.

Several sets of formulations based on various polymers with different density, initial crystallinity and haze were prepared following by extrusion of films of two thicknesses: 0.175 mm and 0.36 mm. In addition, approximately 1.1% VTES coupling agent was incorporated in all formulations to get good adhesion of film to glass. Film samples were used to manufacture samples of safety glass sandwiches (glass-film-glass). Films were extruded using variation of the cooling temperature of the casting rolls to quench the film and influence the initial crystallinity and haze. Haze evaluation of film showed that the haze increase was practically linear with the thickness of film. Haze values of different film are given below for one thickness of film: 0.175 mm (7 mil). The thickness of the glass was 3 mm. Results of haze evaluation versus initial crystallinity of the basic resin and content of the Millad 3940 clarifying agent are given below in Table 5 for safety glass produced using an autoclave at 140° C. and 13 Bar pressure.

All resins in Table 5 had a polydispersity index of 2.3 to 2.5

TABLE 5

| Sample | Resin density g/ccm | Initial crystal-linity % (wt.) | Initial haze of resin % | Millad 3940 clarifying agent % (wt.) | Haze of the lamina % |
|---|---|---|---|---|---|
| Set #1 Exxon Exact resin | | | | | |
| 1.1 | 0.915 | 24 | 16 | 0 | 38 |
| 1.2 | 0.915 | 24 | 16 | 0.05 | 29 |
| 1.3 | 0.915 | 24 | 16 | 0.15 | 26 |
| 1.4 | 0.915 | 24 | 16 | 0.20 | 24 |
| 1.5 | 0.915 | 24 | 16 | 0.50 | 17 |
| 1.6 | 0.915 | 24 | 16 | 1.00 | 11 |
| 1.7 | 0.915 | 24 | 16 | 1.50 | 10 |
| 1.8 | 0.915 | 24 | 16 | 2.00 | 10 |
| 1.9 | 0.915 | 24 | 16 | 2.50 | 11 |
| Set #2 Exxon Exact resin | | | | | |
| 2.1 | 0.905 | 16 | 8 | 0 | 8 |
| 2.2 | 0.905 | 16 | 8 | 0.05 | 8 |
| 2.3 | 0.905 | 16 | 8 | 0.15 | 8 |
| 2.4 | 0.905 | 16 | 8 | 0.20 | 5 |
| 2.5 | 0.905 | 16 | 8 | 0.50 | 4 |
| 2.6 | 0.905 | 16 | 8 | 1.00 | 3.5 |
| 2.7 | 0.905 | 16 | 8 | 2.00 | 3.5 |
| 2.8 | 0.905 | 16 | 8 | 2.50 | 5.5 |
| Set #3 Exxon Exact resin | | | | | |
| 3.1 | 0.900 | 11 | 5.5 | 0.10 | 5.5 |
| 3.2 | 0.900 | 11 | 5.5 | 0.50 | 4.6 |
| 3.3 | 0.900 | 11 | 5.5 | 0.90 | 3.8 |
| 3.4 | 0.900 | 11 | 5.5 | 1.20 | 3.6 |
| 3.5 | 0.900 | 11 | 5.5 | 1.50 | 3.2 |
| 3.6 | 0.900 | 11 | 5.5 | 2.00 | 3.4 |
| 3.7 | 0.900 | 11 | 5.5 | 2.30 | 4.8 |
| Set #4 Exxon Exact resin | | | | | |
| 4.1 | 0.896 | 8 | 4.7 | 0.20 | 4.7 |
| 4.2 | 0.896 | 8 | 4.7 | 0.50 | 2.9 |
| 4.3 | 0.896 | 8 | 4.7 | 0.90 | 2.2 |
| 4.4 | 0.896 | 8 | 4.7 | 1.20 | 2.0 |
| 4.5 | 0.896 | 8 | 4.7 | 2.20 | 2.4 |
| Set #5 Exxon Exact resin | | | | | |
| 5.1 | 0.888 | 7 | 3.9 | 0.50 | 1.90 |
| 5.2 | 0.888 | 7 | 3.9 | 0.75 | 1.41 |
| 5.3 | 0.888 | 7 | 3.9 | 0.90 | 1.11 |
| 5.4 | 0.888 | 7 | 3.9 | 1.25 | 0.95 |
| 5.5 | 0.888 | 7 | 3.9 | 1.70 | 1.10 |
| Set #6 Exxon Exact resin | | | | | |
| 6.1 | 0.878 | 5 | 3.2 | 0.50 | 1.41 |
| 6.2 | 0.878 | 5 | 3.2 | 0.95 | 0.95 |
| 6.3 | 0.878 | 5 | 3.2 | 1.50 | 0.66 |
| 6.4 | 0.878 | 5 | 3.2 | 1.70 | 0.79 |
| Set #7 Dow Affinity resin | | | | | |
| 7.1 | 0.900 | 12 | 6.5 | 0.70 | 2.30 |
| 7.2 | 0.900 | 12 | 6.5 | 1.10 | 1.34 |
| 7.3 | 0.900 | 12 | 6.5 | 1.45 | 1.10 |
| 7.4 | 0.900 | 12 | 6.5 | 1.70 | 1.41 |
| Set #8 Dow Engage resin | | | | | |
| 8.1 | 0.875 | 5 | 3.0 | 0.50 | 1.29 |
| 8.2 | 0.875 | 5 | 3.0 | 0.90 | 0.78 |
| 8.3 | 0.875 | 5 | 3.0 | 1.25 | 0.61 |
| 8.4 | 0.875 | 5 | 3.0 | 1.50 | 0.52 |
| 8.5 | 0.875 | 5 | 3.0 | 2.00 | 0.84 |
| Set #9 Dow Engage resin | | | | | |
| 9.1 | 0.868 | 2–3 | 2.9 | 0.50 | 1.49 |
| 9.1 | 0.868 | 2–3 | 2.9 | 0.90 | 0.55 |
| 9.1 | 0.868 | 2–3 | 2.9 | 1.10 | 0.41 |
| 9.1 | 0.868 | 2–3 | 2.9 | 2.00 | 0.95 |
| Set 10 Union Carbide resin | | | | | |
| 10.1 | 0.895 | 6–7 | 4.9 | 0.50 | 2.4 |
| 10.2 | 0.895 | 6–7 | 4.9 | 1.00 | 1.9 |
| 10.3 | 0.895 | 6–7 | 4.9 | 1.50 | 1.9 |

TABLE 5-continued

| Sample | Resin density g/ccm | Initial crystallinity % (wt.) | Initial haze of resin % | Millad 3940 clarifying agent % (wt.) | Haze of the lamina % |
|---|---|---|---|---|---|
| Set #11 Exxon Exact resin | | | | | |
| 11.1 | 0.860 | 0–2 | 2.9 | 0.50 | 1.89 |
| 11.2 | 0.860 | 0–2 | 2.9 | 1.10 | 0.50 |
| 11.3 | 0.860 | 0–2 | 2.9 | 1.25 | 0.40 |
| 11.4 | 0.860 | 0–2 | 2.9 | 1.50 | 0.55 |
| Set #12 Mobil experimental resin | | | | | |
| 12.1 | 0.855 | 0 | 2.7 | 0.50 | 2.70 |
| 12.2 | 0.855 | 0 | 2.7 | 0.90 | 2.30 |
| 12.3 | 0.855 | 0 | 2.7 | 1.25 | 1.90 |
| 12.4 | 0.855 | 0 | 2.7 | 1.70 | 2.00 |
| Set #13 Mobil experimental resin | | | | | |
| 13.1 | 0.850 | 0 | 1.9 | 0.50 | 1.90 |
| 13.2 | 0.850 | 0 | 1.9 | 1.00 | 0.97 |
| 13.3 | 0.850 | 0 | 1.9 | 1.50 | 1.65 |

The preferable initial crystallinity was less than 20% to obtain a film interlayer with low final crystallinity and low haze.

The nucleation agent significantly improved the optical properties of the interlayer and the final glass lamina. The concentration of the agent with acceptable performance was in the range from 0.05% to 2.0%, with better results from 0.2% to 2.0% and best results from 0.5% to 1.0%.

The density of the basic resin influences the crystallinity and therefore the clarity and haze of the interlayer and optical laminate. Optical laminates made using resin with density higher than 0.905 g/ccm exhibited haze higher than 4% required for most optical applications. Acceptable resin has a density in the range from 0.850 g/ccm to 0.905 g/ccm. Resin with density lower than 0.850 g/ccm exhibited a very low haze but also a very low use temperature, and would need heavy cross-linking to prevent melting during lamination and use of the optical lamina.

EXAMPLE 5

A multilayer film (A/B/A construction) was co-extruded from Escorene™ LD768.36 EVA (>24% vinyl acetate groups) and Exact™ 4053 metallocene LVLDPE (0.888 g/cc density) (obtained from Exxon Corporation, Baytown, Tex.) through a feedblock and a co-extrusion flat die using two 4.45 cm (1¾ inch) extruders to a final film thickness of 0.38 mm (0.015 inch). Each EVA film skin layer was 0.038 mm (0.0015 inch) thick and the core LVLDPE was 0.30 mm (0.012 inch). The EVA contained no additives. The LVLDPE was blended with 2.0 wt % sorbital nucleation agent; <0.25 wt % benzotriazole UV absorber and a triazine UV stabilizer; and <0.5 wt % peroxide and initiator crosslinking agent.

The resulting interlayer film was laminated between two mineral glass substrate and the laminate was tested by the methods described above. The interlayer film was securely bonded to the glass. The resulting laminate has a haze value <3% and a pummel-test value of 3. No primer was used on the glass substrate.

EXAMPLE 6

A coupling agent, 1 wt % aminopropyltriethoxysilane (APTES), was added to the EVA used in Example 5 and an A/B/A construction interlayer film was prepared, laminated and tested as described in Example 5, except that the APTES-containing EVA was used in place of the neat EVA used in Example 5.

The resulting laminate has a haze value of <3% and a pummel test value of 6–9. No primer was used on the glass substrate.

EXAMPLE 7

The metallocene LVLDPE of Example 5, together with the additives of Example 5, was extruded using a single extruder equipped with a 5.08 cm (2 inch) screw. A film of the EVA with 1 wt % APTES of Example 6 was extruded separately on the same extruder. These films were laminated together in an A/B/A configuration by pressing them between sheets of polytetrafluoroethylene in a laboratory press (Model 3891 Press, manufactured by Carver, Inc., Wasbash, Ind.) for three minutes at 100° C. and 11 bar. The resulting interlayer film was laminated between two glass substrates and tested as described above. The laminate had a haze value of 1% and a pummel test value of 6–9. No primer was used on the glass substrate.

We claim:

1. A method of making an optical laminate, comprising the steps:
    a) extruding an interlayer film from a blend of at least one linear low density polyolefin having a density from about 0.850 to 0.905 g/ccm, a polydispersity index of less than 3.5, and less than 20%, by weight, crystallinity; a coupling agent in an amount of from about 0.2% to about 2.0% by weight of a total formulation; a nucleation agent in an amount of from about 0.05% to about 2.0% by weight of the total formulation; a crosslinking agent in the amount of from about 0.05% to about 2% by weight of the total formulation;
    b) incorporating the interlayer film between at least two sheets of material selected from the group consisting of mineral glass, polymer glass and combinations thereof; and
    c) adhering the interlayer film to the sheets of material to form an optical laminate, wherein the optical laminate has a haze value of less than 4% at a film thickness of 125 to 1,000 mcm.

2. The method of claim 1 wherein the linear low density polyolefin is selected from the group consisting of LVLDPE and LULDPE polymers and linear very low density and linear ultra low density copolymers of ethylene, and combinations thereof.

3. A method of making an optical laminate, comprising the steps:
    a) extruding a polyolefin film from a formulation comprising at least one linear low density polyolefin having a density from about 0.850 to 0.905 g/ccm, a polydispersity index of less than 3.5, and less than 20%, by weight, crystallinity; a nucleation agent in an amount of from about 0.05% to about 2.0% by weight of the film; a crosslinking agent in the amount of from about 0.05% to about 2% by weight of the polyolefin film;
    b) extruding a film comprising ethylene vinyl acetate;
    c) bonding the polyolefin film to at least one ethylene vinyl acetate film to form an interlayer film;
    d) incorporating the interlayer film between at least two sheets of material selected from the group consisting of mineral glass, polymer glass and combinations thereof; and
    e) adhering the interlayer film to the sheets of material to form an optical laminate, wherein the optical laminate has a haze value of less than 4% at a film thickness of 125 to 1,000 mcm.

4. The method of claim 3 wherein the interlayer film further comprises a UV-light absorber in an amount of from about 0.1% to about 1.5% weight of the interlayer film.

5. The method of claim 3 wherein the interlayer film further comprises additives selected from the group consisting of colorizing agents and IR Light blocking agents.

6. The method of claim 3 wherein the linear low density polyolefin is selected from the group consisting of LVLDPE and LULDPE polymers and linear very low density and linear ultra low density copolymers of ethylene, and combinations thereof.

7. A method of claim 3, wherein the polyolefin film is bonded to at least one ethylene vinyl acetate film by co-extrusion.

8. The method of claim 7, further comprising the step of crosslinking the polyolefin composition.

9. The method of claim 7 further comprising the step of embossing a pattern on at least one side of the interlayer film.

* * * * *